United States Patent
Coates

(10) Patent No.: US 6,789,516 B2
(45) Date of Patent: Sep. 14, 2004

(54) ROTARY VALVE AND VALVE SEAL ASSEMBLY FOR ROTARY VALVE ENGINE HAVING HEMISPHERICAL COMBUSTION CHAMBERS

(76) Inventor: George J. Coates, Rte. 34 & Ridgewood Rd., Wall, NJ (US) 07719

( * ) Notice: Subject to any disclaimer, the term of this patent is extended or adjusted under 35 U.S.C. 154(b) by 38 days.

(21) Appl. No.: 10/336,896

(22) Filed: Jan. 7, 2003

(65) Prior Publication Data

US 2004/0159293 A1 Aug. 19, 2004

(51) Int. Cl.[7] .................................................. F01L 7/10
(52) U.S. Cl. ............................................. 123/80 BA
(58) Field of Search ................................ 277/403, 500; 123/80 BA, 80 R, 80 BB, 190.17, 190.14, 190.4, 190.1

(56) References Cited

U.S. PATENT DOCUMENTS

| | | | | | |
|---|---|---|---|---|---|
| 4,077,382 A | * | 3/1978 | Gentile | .................... | 123/190.2 |
| 4,944,261 A | * | 7/1990 | Coates | .................. | 123/190.14 |

\* cited by examiner

Primary Examiner—Tony M. Argenbright
Assistant Examiner—Hyder Ali
(74) Attorney, Agent, or Firm—Clifford G. Frayne

(57) ABSTRACT

A valve arrangement for a rotary valve assembly for use in an internal combustion engine of the piston and cylinder type, wherein the cylinder head/combustion chamber is of the hemispherical type, the valve seals being positioned in angled relationship to the hemispherical heads so as to permit charging of the cylinder with a fuel/air mixture and evacuation of spent gases.

3 Claims, 3 Drawing Sheets

ROTARY VALVE AND VALVE SEAL ASSEMBLY FOR ROTARY VALVE ENGINE HAVING HEMISPHERICAL COMBUSTION CHAMBERS

BACKGROUND OF THE INVENTION

1. Field of the Invention

The present invention relates to an internal combustion engine of the piston-cylinder type having a spherical rotary valve assembly for the introduction of the fuel/air mixture to the cylinder and the evacuation of the exhaust gases, and is particularly directed towards the positioning of the valves and valve seals for such rotary valve assembly about a hemispherically-shaped cylinder head/combustion chamber.

2. Description of the Prior Art

The Applicant herein has directed considerable attention to the internal combustion engine of the piston-cylinder type and in particular to the replacement of the poppet valve system, including the poppet valve, springs, mountings and associated cam shaft, with a spherical rotary valve assembly for the introduction of the fuel air mixture into the cylinder and for the evacuation of the exhaust gases. Applicant is the named inventor in U.S. Pat. No. 4,989,576, "Internal Combustion Engine"; U.S. Pat. No. 4,944,261, "Spherical Rotary Valve Assembly for Internal Combustion Engine"; U.S. Pat. No. 4,953,527, "Spherical Rotary Valve Assembly for Internal Combustion Engine"; U.S. Pat. No. 4,976,232, "Valve Seal for Rotary Valve Engine"; U.S. Pat. No. 4,989,558, "Spherical Rotary Valve Assembly for Internal Combustion Engine"; U.S. Pat. No. 5,109,814, "Spherical Rotary Valve"; U.S. Pat. No. 5,361,739, "Spherical Rotary Valve Assembly for Use in a Rotary Valve Internal Combustion Engine"; and U.S. Pat. No. 6,308,676 B1, "Cooling System for Rotary Valve Engine". The aforementioned U.S. Patents are incorporated herein as if set forth in length and in detail.

The present invention which is the subject to this application relates to the valve and valve seal and their positioning relative to a hemispherical cylinder head/combustion chamber.

OBJECTS OF THE INVENTION

An object of the present invention is to provide for a novel and improved valve, valve seal and cylinder head/combustion chamber arrangement for a rotary valve engine.

A further object of the present invention is to provide for a novel and improved valve, valve seal and cylinder head/combustion chamber arrangement for a rotary valve engine assembly wherein the cylinder head/combustion chamber is of a hemispherical design.

SUMMARY OF THE INVENTION

A valve arrangement for a rotary valve assembly for use in an internal combustion engine of the piston and cylinder type, wherein the cylinder head/combustion chamber is of the hemispherical type, the valve seals being positioned in angled relationship to the hemispherical heads so as to permit charging of the cylinder with a fuel/air mixture and evacuation of spent gases.

BRIEF DESCRIPTION OF THE DRAWINGS

These and other advantages and improvements will be evident, especially when taken in light of the following illustrations wherein.

DETAILED DESCRIPTION OF THE INVENTION

The function of a spherical rotary valve assembly for an internal combustion engine of the piston and cylinder type is to eliminate the cam shaft and poppet valves and related hardware, thus simplifying the engine. A spherical rotary intake valve of the type illustrated in FIG. 5 introduces the fuel/air mixture into the cylinder and a spherical rotary exhaust valve would evacuate the spent gases. The operation of the spherical rotary intake valve and spherical rotary exhaust valve, together with their attendant valve seals, is discussed in detail in the aforementioned patents which are incorporated as set forth in length and detail herein.

The aforesaid patents reflect certain changes and improvements in the structure and operation of the spherical rotary intake valve and the spherical rotary exhaust valve, as well as improvements to the valve seals associated therewith. There are presently pending additional applications also directed to significant improvements in the valve seal and the valves themselves.

This application addresses the positioning of the valve seals and the spherical rotary intake valve and spherical rotary exhaust valve in an engine in which the cylinder head/combustion chamber is of a hemispherical design, which design can be found in large bore engines of the gasoline variety, and diesel engines.

Figure 1:
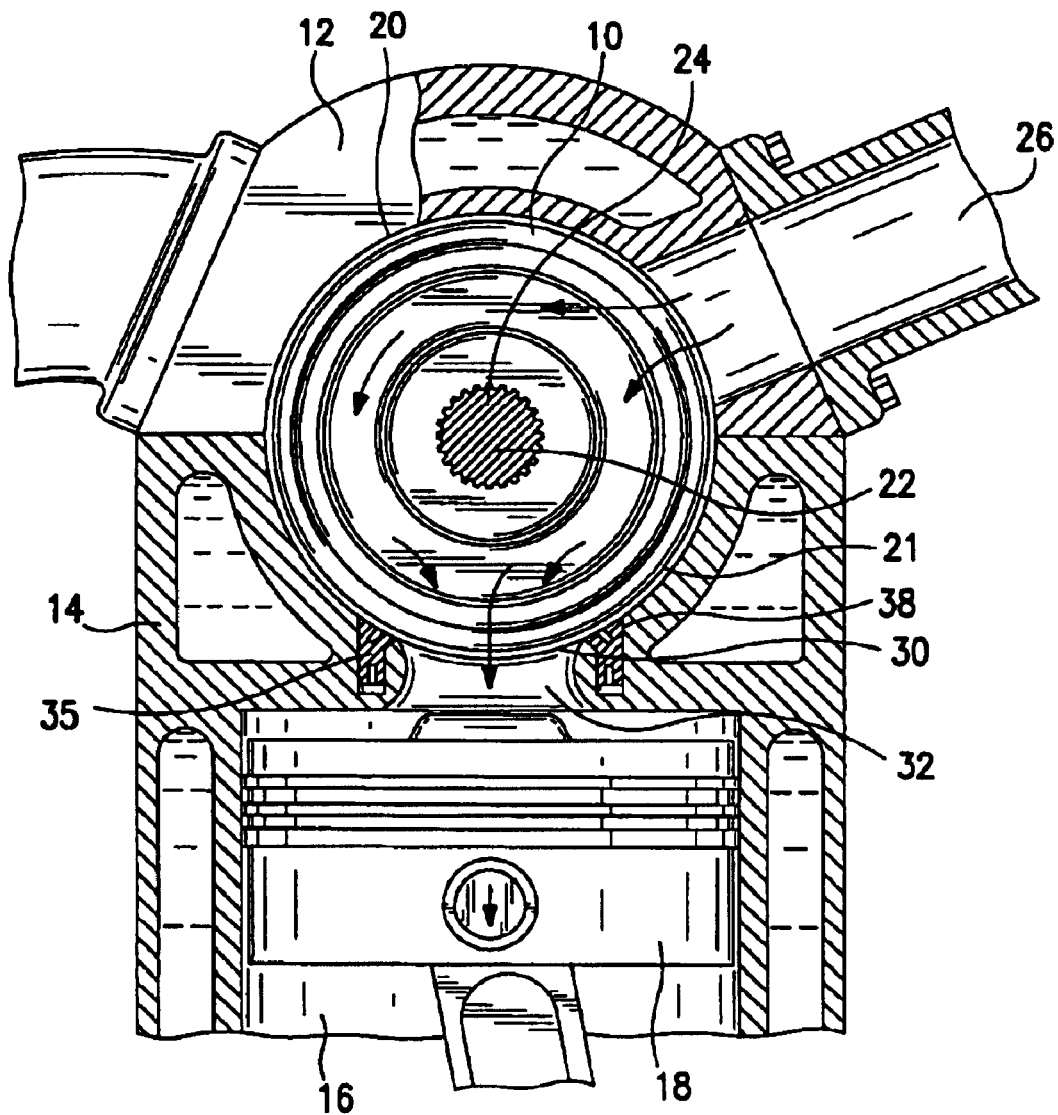
FIG. 1 is an end cross-sectional view of the arrangement of Applicant's previous spherical rotary valve assembly.

Referring to FIG. 1, there is illustrated an end cross-sectional view of an earlier embodiment of the spherical rotary valve assembly of Applicant's prior patents detailing the relationship between a rotary intake valve 10 enclosed within an upper half 12 and lower half 14 of a split head assembly. The split head assembly is secured to an engine block having cylinder 16 within which piston 18 reciprocates.

The split head assembly comprising upper half 12 and lower half 14 defines a drum accommodating cavity 20 within which rotary intake valve 10 is positioned. Rotary intake valve 10 is positioned on shaft 22 which passes through a centrally positioned aperture 24 on the rotary intake valve 10. As discussed in detail in Applicant's prior patents heretofore set forth, rotary intake valve 10 provides for communication between fuel air inlet port 26 and cylinder 16 by means of an aperture 30 positioned on the spherical periphery 21 of the rotary valve 10 which comes into successive registration with inlet port 32 to cylinder 16.

Rotary intake valve 10 rotating within drum accommodating cavity 20 on shaft 22 is in contact with valve seal 35, annularly positioned in an annular groove or seat 38 about inlet port 32 to cylinder 16. Valve seal 35 serves to provide a seal to insure that the fuel/air mixture passes from rotary intake valve 10 into cylinder 16 during the intake stroke and further provides a seal with rotary intake valve 10 during the compression stroke to insure that the ignition of the fuel/air mixture occurs within cylinder 16 and does not migrate into drum accommodating-cavity 20. Further, seal 35 provides a seal with rotary intake valve 10 during the exhaust stroke to insure that the exhaust gases exit through the rotary exhaust valve.

Figure 2:
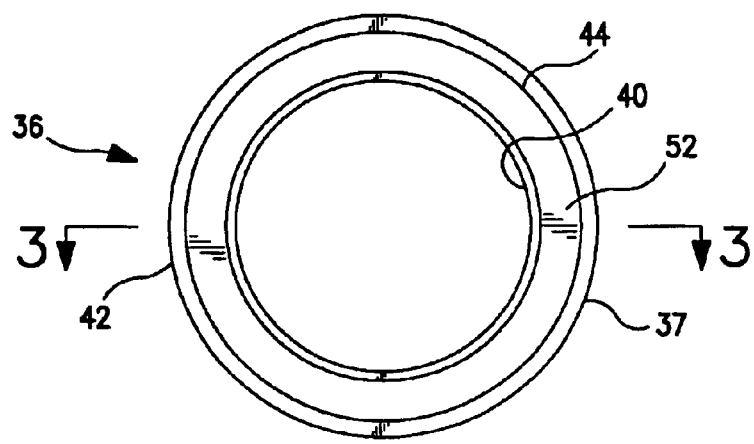
FIG. 2 is a top view of a valve seal for use in the present invention.
Figure 3:
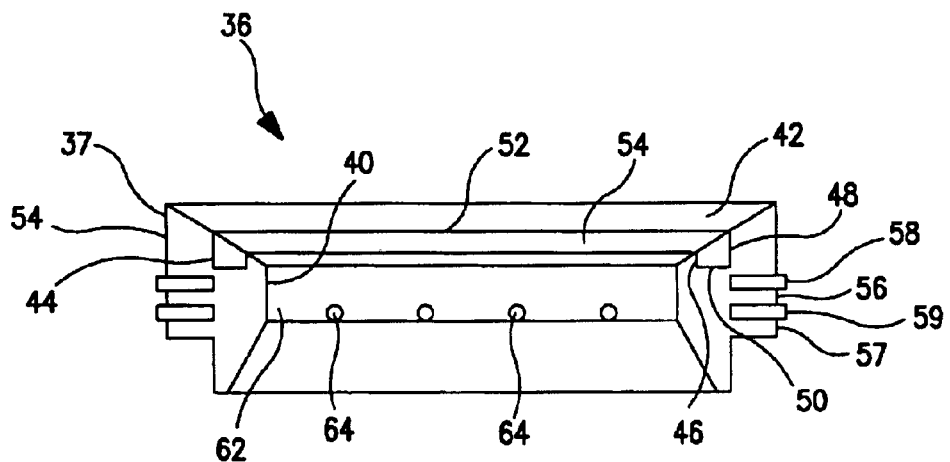
FIG. 3 is a side cutaway view of a valve seal for use in the present invention.
Figure 4:
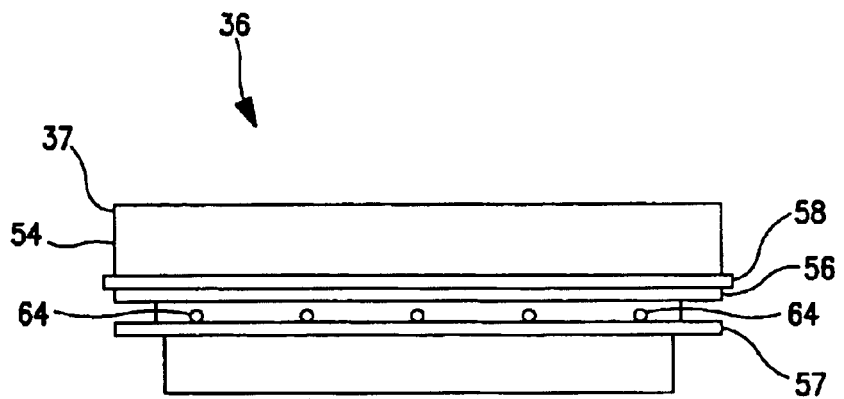
FIG. 4 is a side view of a valve seal for use in the present invention.

Referring now to FIGS. 2, 3 and 4, which are a top, side cutaway, and side view of a valve seal 36 suitable for use with a hemispherical cylinder head/combustion chamber, the description of valve seal as contained herein is made with respect to a rotary intake valve as shown and illustrated in FIG. 1. Valve seal 35 is of the same design and serves the same purpose and function with respect to its relationship to the rotary exhaust valve of the spherical rotary valve assembly as disclosed in Applicant's prior patents heretofore identified. It is further understood that each cylinder would have at least one rotary intake valve and one rotary exhaust valve and a valve seal associated with each.

Valve seal 36 is comprised of a valve seal body 37 and a ceramic carbon insert lubricating ring 52 as more fully described hereafter. Valve seal 36 has a centrally disposed aperture 40 alignable with inlet port 32 when valve seal 36 is seated in annular groove or seat 38. The annular groove or seat 38 may have a curvature parallel to the inner surface of the hemispherical cylinder head combustion chamber. Still further, bottom annular surface 41 of valve seal 36 may also have a curvature complementary with that of the annular groove or seat 38. The upper annular surface 42 of valve body 37 is curved inwardly towards the center of aperture 40. This curvature corresponding to the spherical periphery curvature 23 of the rotary intake valve 10. Upper surface 42 of valve body 37 is formed with an annular groove 44 which is defined by an inner side wall 46, outer side wall 48, and base surface 50. The inner side wall 46 forms a 90 degree angle with base surface 50, while outer side wall 48 forms an angle of less than 90 degrees with base surface 50. Annular groove 44 is for receipt of a ceramic carbon insert lubricating ring 52. The carbon insert lubricating ring 52 is positioned in the annular groove 44 such that its upper surface 54 coincides with the curvature of the upper surface 42 of valve body 37. In mating the carbon insert lubricating ring 52 to the valve body 37, valve body 37 would be heated so that it would undergo slight expansion. The ceramic carbon insert lubricating ring 52 would then be inserted into annular groove 44 during its heating process. The valve body 37 would then be allowed to cool. Since outer side wall 48 of the annular groove is slightly offset from 90 degrees in the direction of inner side wall 46, the ceramic carbon insert lubricating ring 52 is locked in position by this "locking angle" and is assured of remaining in position regardless of how hot the valve seal 36 became during the combustion process of the internal combustion engine. This is particularly important when the internal combustion engine to which the valve seal is affixed is being powered by natural gas which generates substantially higher temperatures than conventional gasoline or diesel fuel.

The outer side wall 54 of valve seal 36 is stepped and formed with a plurality of spaced apart annular ribs 56 and 57 for the receipt and positioning of a sealing or blast rings 58 and 59 which function much like a piston ring establishing a seal between valve seal 36 side wall 54 and the periphery of annular groove or seat 38 about inlet port 32. In the present embodiment there is illustrated two ribs 56 and 57 and two sealing or blast rings 58 and 59.

There is further formed on valve seal 36, between its outer side wall 60 and its inner side wall 62 which defines aperture 40 a plurality of radial throughbores 64 formed about the periphery which permit communication of gases from the cylinder head through the side wall 54 of valve seal 36 and to communicate against sealing ring 59. This design enhances the sealing and seating of valve seal 36 when the piston is moving upwardly under a compression stroke. In such a situation, the rotary intake valve 10 would have rotated such that its spherical periphery 21 had closed aperture 40 of valve seal 36. The piston, under compression stroke would compress the gases within the cylinder head. The throughbores 64 allow these compressed gases to exercise pressure on sealing ring 58 and in turn force sealing ring 58 into contact with the wall of valve seat 38.

Figure 5:
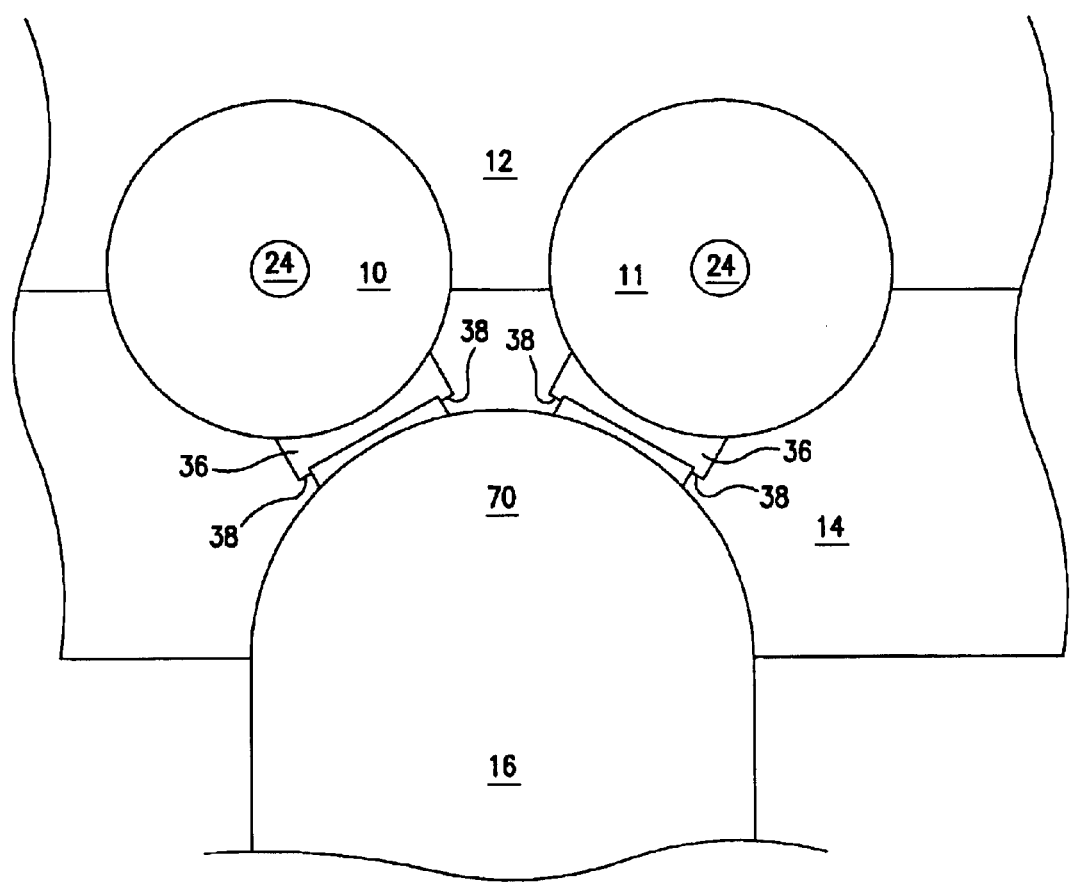
FIG. 5 is an end cross-sectional view of the hemispherical cylinder head/combustion chamber and the spherical rotary valve assembly showing the relationship of the spherical rotary valve and valve seal to the hemispherical combustion chamber.

FIG. 5 is an end cross-sectional view of a spherical rotary valve assembly of the present invention with relationship to a hemispherical cylinder head/combustion chamber. Many of the elements are the same, but the arrangement differs in order to accommodate the hemispherical cylinder head/combustion chamber. The rotary intake valve 10 and the rotary exhaust valve 11 are enclosed within an upper half 12 and lower half 14 of a split head assembly. Split head assembly is secured to an engine block having a cylinder 16 within which a piston reciprocates. In this instance, the cylinder head/combustion chamber 70 is hemispherical in shape and formed in the lower half 14 of the split head assembly. The drum accommodating cavity 20 within which the rotary intake valve 10 is positioned and a similar drum accommodating cavity within which the rotary exhaust valve 11 is positioned are formed when the upper half 12 and lower half 14 of the split head assembly are secured. Each rotary intake valve and rotary exhaust valve 10 and 11 respectively have an aperture 24 for mounting on a shaft for rotation. Valve seal 36 would be positioned on valve seat 38, valve seat 38 being an annular surface which would engage the lower wall of valve seal 36. The optimum configuration would have the inlet port and the outlet port for the hemispherical cylinder head/combustion chamber 70 to be positioned in 180 degree relationship with each other on the dome of the hemispherical cylinder head/combustion chamber 70. FIG. 5 illustrates this configuration and allows for the shortest distance that the gases must travel from the apertures on the periphery of the spherical rotary intake valve 10 to the cylinder head/combustion chamber 70 and the shortest distance from the cylinder head/combustion chamber 70 to the apertures on the spherical rotary exhaust valve 11 for evacuation from the hemispherical cylinder head/combustion chamber 70. The intake conduits and exhaust conduits to and from the spherical rotary intake valve and spherical rotary exhaust valve have not been illustrated, but are fully explained in Applicant's prior patents.

With respect to the hemispherical cylinder head/combustion chamber 70, it is in some instances permissible to stagger or offset the inlet port and the outlet port in order to accommodate the positioning of the inlet conduits and exhaust conduits within the upper half 12 of the split head assembly. In either configuration of the inlet ports, either in 180 degree relationship or slightly staggered, the combination of spherical rotary valves and valve seals allows for introduction of the fuel and air mixture into a hemispherical cylinder head/combustion chamber and the evacuation of the spent gases from the hemispherical cylinder head/combustion chamber. Still further, while the description of the arrangement with respect to the hemispherical cylinder head/combustion chamber has been disclosed with respect to one type of valve seal developed by Applicant, the valve seals of the type described in Applicant's prior patents would also be suitable.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A valve arrangement for a rotary valve assembly for use in an internal combustion engine of the piston and cylinder type, wherein the cylinder combustion chamber is of the hemispherical type, the rotary valve assembly positioned within a two piece cylinder head, said cylinder head defining a plurality of drum accommodating cavities for receipt of a plurality of rotary intake valves and rotary exhaust valves, said rotary intake valves and said rotary exhaust valves having a spherical section defined by two parallel planes of the sphere, said planes being disposed symmetrically about the center of said sphere, defining a spherical periphery and planar end walls, said rotary intake valves and said rotary exhaust valves mounted on the shaft means within said drum accommodating cavities in gas tight sealing contact with an inlet port and an exhaust port respectively, said rotary intake valve and said rotary exhaust valve having passageways therethrough for the introduction and interruption of fuel air mixture to the cylinder and the evacuation of exhaust gases from the cylinder respectively, said gas tight sealing contact of said rotary intake valve and said rotary exhaust valve of said intake port and said exhaust port, respectively, accomplished by a valve seal and a valve seat, the valve arrangement for said hemispherical combustion chamber comprising:

an inlet port and an outlet port in angled relationship with respect to each other, said inlet port and said outlet port defining a valve seat, said valve seat of said inlet port and said valve seat of said outlet port in angled relationship with respect to each other;

an inlet valve seal and an outlet valve seal positioned in said respective inlet ports and said outlet ports, said inlet valve seal and said outlet valve seal in non-planar angled relationship with respect to each other and in communication with said drum accommodating cavities for contact with said spherical rotary intake valve and said spherical rotary exhaust valve respectively wherein said intake valve seal and said outlet valve seal are in 30 degree angular relationship with a plane defined by joinder of said two piece cylinder head.

2. The valve arrangement in accordance with claim 1 wherein said inlet port and said outlet port and said respectively inlet valve seal and said outlet valve seal are in 180 degree spaced relationship.

3. The valve arrangement in accordance claim 1 wherein said inlet port and said outlet port and said inlet valve seal and said outlet valve seal are in less than 180 degree spaced apart relationship.

* * * * *